Jan 6, 1931.  A. E. ARMSTRONG  1,787,465
VALVE MECHANISM
Filed Oct. 7, 1927
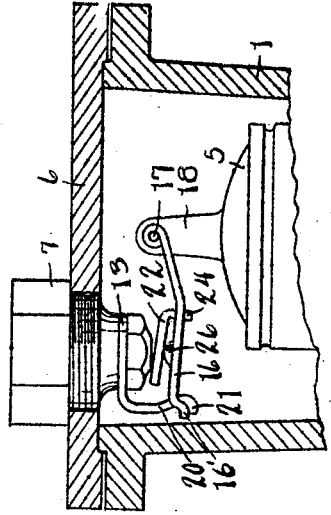
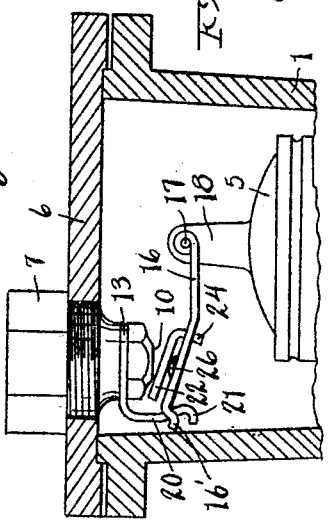
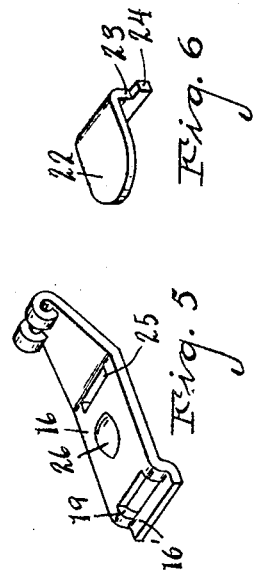
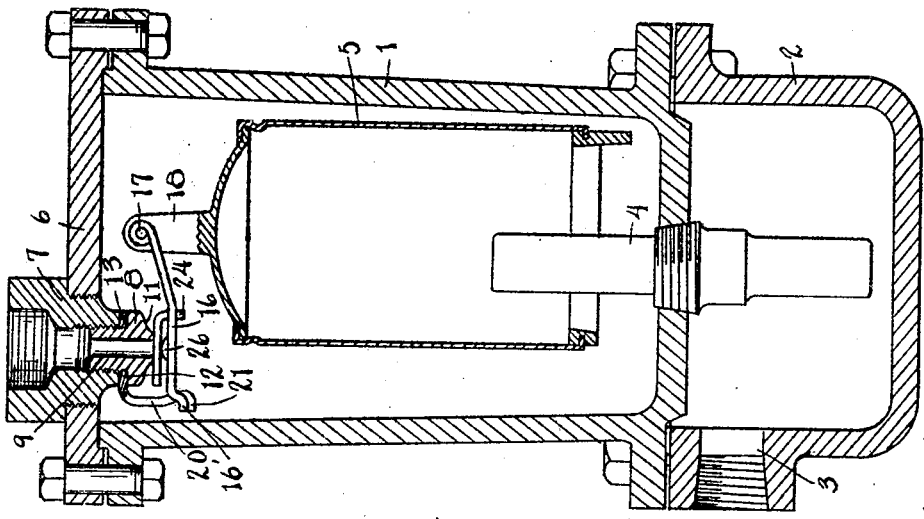
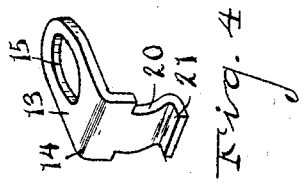
INVENTOR
Adam E. Armstrong
BY Chappell & Earl
ATTORNEYS Patented Jan. 6, 1931

1,787,465

UNITED STATES PATENT OFFICE

ADAM E. ARMSTRONG, OF THREE RIVERS, MICHIGAN

VALVE MECHANISM

Application filed October 7, 1927. Serial No. 224,752.

The main objects of this invention are:

First, to provide in a steam trap an improved discharge valve mechanism which is very easily opened, even when under high pressure.

Second, to provide an improved valve mechanism which quickly opens and closes without chattering or fluttering.

Third, to provide an improved valve mechanism of the class described which is very durable and not likely to get out of repair.

Objects pertaining to details and economies of my invention will definitely appear from the description to follow. The invention is defined in the claims.

A structure embodying the features of my invention is clearly illustrated in the accompanying drawing forming a part of this application, in which:

Fig. 1 is a vertical central section of a steam trap embodying the features of my invention, the parts being shown with the valve in closed position and parts being illustrated in full lines for convenience in illustration.

Fig. 2 is a fragmentary sectional view showing the valve partially open.

Fig. 3 is a fragmentary sectional view similar to that of Fig. 2 with the valve fully opened.

Fig. 4 is a perspective view of the valve lever hanger or support.

Fig. 5 is a perspective view of the valve lever.

Fig. 6 is a perspective view of the valve.

Referring to the drawing, the float chamber 1 is provided with a separating chamber 2 having an inlet at 3. The separating chamber 2 is connected to deliver to the float chamber 1 by means of the vertical pipe 4 which depends into the separating chamber to a point near the bottom thereof and projects centrally into the float chamber.

The float 5 is of the inverted type shown in Letters Patent No. 1,309,604 granted to me under date of July 15, 1919. The top 6 of the float chamber has a discharge pipe coupling member 7 threaded into the same. This coupling member 7 constitutes a support for the valve seat member 8 which has a central discharge port 9 therein.

The valve seat 10 is flat and the valve seat member inclined upwardly at 11 from the valve seat. The valve seat member 8 is shouldered at 12 to clamp the arm 13 of the angled valve lever support 14. This arm 13 has an opening 15 therein to receive the valve seat member so that the valve seat member is clamped between this shoulder 12 and the end of the coupling member 7.

The valve lever 16 is pivoted at 17 to the upwardly projecting arm 18 on the float and has a slot 19 engaging the downwardly projecting arm 20 of the support 14. This slot allows a limited vertical movement of the lever on the support and also a pivotal movement, the support having a rest 21 at its lower end on which the end 16' of the lever rests when the lever is in its valve closing position as shown in Fig. 1.

The valve 22 is formed as a stamping from a flat piece of metal having a downturned end 23 with laterally projecting lugs 24, this valve being passed through the slot 25 in the lever 16 with the lugs engaging the under side thereof. The slot is of such size as to permit tilting movement of the valve on the lever.

A spherically curved thrust member 26 is provided on the lever to engage and support the valve at a central point. When the valve opens it tilts about the edge of the valve seat, the valve having a limited rocking or tilting movement in both directions so that when the valve is closed it rests or closes flat against the valve seat.

With the parts thus arranged a very powerful leverage is secured to start the valve from its seat so that the valve is not likely to become stuck or to be held in closed position by pressure.

My improvement is well adapted for embodiment in compact structures, is simple and economical in its parts and not likely to become scored or worn as a full opening of the valve is had at each operation.

I have illustrated and described my improvements in a simple and practical embodiment. I have not attempted to illustrate or describe various adaptations and modifications which I contemplate as it is believed that this disclosure will enable those skilled in the art to embody or adapt the same as may be desired.

Having thus described my invention what I claim as new and desire to secure by Letters Patent is:

1. The combination of a float chamber provided with an inlet at the bottom thereof, a discharge coupling member threaded into the top wall of said float chamber, a shouldered valve seat member threaded into said coupling member and provided with a discharge port surrounded by a downwardly facing valve seat, the end of said valve seat member being upwardly inclined from the edge of the valve seat, an inverted float disposed over said inlet, an angled valve lever support having one arm clamped between the end of said coupling member and the shoulder of said valve seat member with the other arm depending at one side of said valve seat member, a valve lever mounted on said depending arm of said support for limited vertical movement thereon, said support being provided with a rest limiting the downward movement of said valve lever thereon, a disk valve loosely mounted on said lever for tilting movement to coact with said valve seat and for tilting movement upon the edge thereof, and a spherically curved thrust member on said valve lever engaging said valve centrally relative to said valve seat when the valve is closed.

2. The combination of a float chamber provided with an inlet at the bottom thereof, a discharge port surrounded by a downwardly facing valve seat, an inverted float disposed over said inlet, a valve lever support depending at one side of said valve seat, a valve lever mounted on said support for pivotal and vertical movement thereon, said support being provided with a rest limiting the downward movement of said lever thereon, a disk valve loosely mounted on said lever for tilting movement upon the edge thereof, and a spherically curved thrust member on said valve lever engaging said valve centrally relative to said valve seat when the valve is closed.

3. The combination of a float chamber provided with a discharge port surrounded by a downwardly facing valve seat, a float, a valve lever support depending at one side of said valve seat, a valve lever mounted on said support for pivotal and vertical movement thereon, said support being provided with a rest limiting the downward movement of said lever thereon, a disk valve loosely mounted on said lever for tilting movement to coact with said valve seat and for tilting movement upon the edge thereof, and a spherically curved thrust member on said valve lever engaging said valve centrally relative to said valve seat when the valve is closed.

4. The combination of a float chamber provided with a discharge comprising a downwardly facing valve seat having a port centrally thereof, a float having an upwardly projecting arm at one side of said valve seat, a lever support at the opposite side of said valve seat, a valve lever mounted on said support for pivotal and sliding movement and pivotally connected to said arm on said float, a valve mounted on said valve lever and adapted to fulcrum upon the edge of the valve seat, and a thrust member engaging the valve between its fulcruming point and its point of connection to said lever.

5. The combination of a float chamber provided with a discharge valve seat, a float, a valve supporting lever pivotally connected at one end to said float, said lever being mounted at its opposite end for pivotal and limited vertical movement, a valve loosely mounted on said lever between its support and said float to coact with said valve seat, said valve being adapted to tilt on the valve seat, and a valve thrust member on said lever engaging the valve centrally thereof.

6. The combination of a float chamber, a discharge valve seat, a float, a valve lever mounted for pivotal and sliding movement and operatively connected to said float, a valve pivotally mounted on said valve lever and adapted to fulcrum on said valve seat, and a rest on said lever engaging the valve between its fulcruming point on said valve seat and its pivotal connection to said lever.

7. The combination of a float chamber provided with a discharge valve seat, a float, a valve supporting lever operatively connected at one end to said float, the opposite end of said lever being mounted for pivotal and limited sliding movement, a valve tiltably mounted on said lever to coact with said valve seat, and a thrust member on said lever engaging the valve.

8. The combination of a float chamber, a discharge valve seat, a float, a valve lever operatively connected to said float, a valve tiltably mounted on said valve lever and adapted to fulcrum on said valve seat, and a rest on said lever engaging the valve between its fulcruming point on said valve seat and its connection to said lever.

9. The combination of a float chamber provided with a discharge valve seat, a float, a valve lever operatively connected to said float, a valve tiltably mounted on said lever to coact with said valve seat, and a thrust member on said lever engaging the valve.

10. The combination of a chamber provided with an inlet, a discharge valve seat, a valve lever one end of which is supported for pivotal and limited vertical movement, a valve on said lever coacting with and fulcruming on said valve seat, means for operating said valve lever.

In witness whereof I have hereunto set my hand.

ADAM E. ARMSTRONG.